United States Patent [19]

Krhounek et al.

[11] 4,197,042
[45] Apr. 8, 1980

[54] COUNTERSINKING TOOL

[75] Inventors: Frank J. Krhounek, Elmhurst; John L. Hiser, Deerfield, both of Ill.

[73] Assignee: Everede Tool Company, Chicago, Ill.

[21] Appl. No.: 917,749

[22] Filed: Jun. 22, 1978

Related U.S. Application Data

[63] Continuation-in-part of Ser. No. 860,994, Dec. 15, 1977, abandoned.

[51] Int. Cl.² .............................................. B23B 51/10
[52] U.S. Cl. .................................... 408/200; 407/104; 408/211; 408/225; 408/713
[58] Field of Search ............... 408/713, 189, 219, 223, 408/224, 225, 227, 228, 200, 201, 202, 211, 194, 195, 85; 407/40, 42, 48, 57, 120, 104

[56] References Cited

U.S. PATENT DOCUMENTS

| | | | |
|---|---|---|---|
| 1,047,466 | 12/1912 | Wagner | 408/224 |
| 1,049,124 | 12/1912 | Merriam | 408/201 |
| 1,471,471 | 10/1923 | Adams | 408/201 X |
| 2,374,761 | 5/1945 | Lusa | 408/201 |
| 2,437,364 | 3/1948 | Smith | 408/189 |
| 2,443,257 | 6/1948 | Leo | 408/200 |
| 3,018,675 | 1/1962 | Klages | 408/189 |
| 3,299,489 | 1/1967 | Pohle | 407/104 |
| 3,341,920 | 9/1967 | Kelm | 407/104 |
| 3,343,431 | 9/1967 | Boyer | 407/104 X |
| 3,540,323 | 11/1970 | Rishel | 407/104 X |

FOREIGN PATENT DOCUMENTS

| | | | |
|---|---|---|---|
| 447341 | 3/1948 | Canada | 408/200 |
| 2437126 | 3/1975 | Fed. Rep. of Germany | 408/227 |

*Primary Examiner*—William R. Briggs
*Attorney, Agent, or Firm*—Merriam, Marshall & Bicknell

[57] ABSTRACT

A countersinking tool comprises a disposable, flat, chip-like cutting insert mounted on a holder rotatable about its axis. The insert is readily assembled or disassembled on the holder by turning a pin which extends through holes in the insert and the holder. The insert has a flat inside surface for seating on a flat surface on the holder, and the insert has a pair of flat, peripheral side surfaces each of which engages against a respective flat surface or locating portion on the holder to locate the insert in a cutting disposition on the holder. The insert and the holder have various features which cooperate to promote the countersinking function.

21 Claims, 21 Drawing Figures

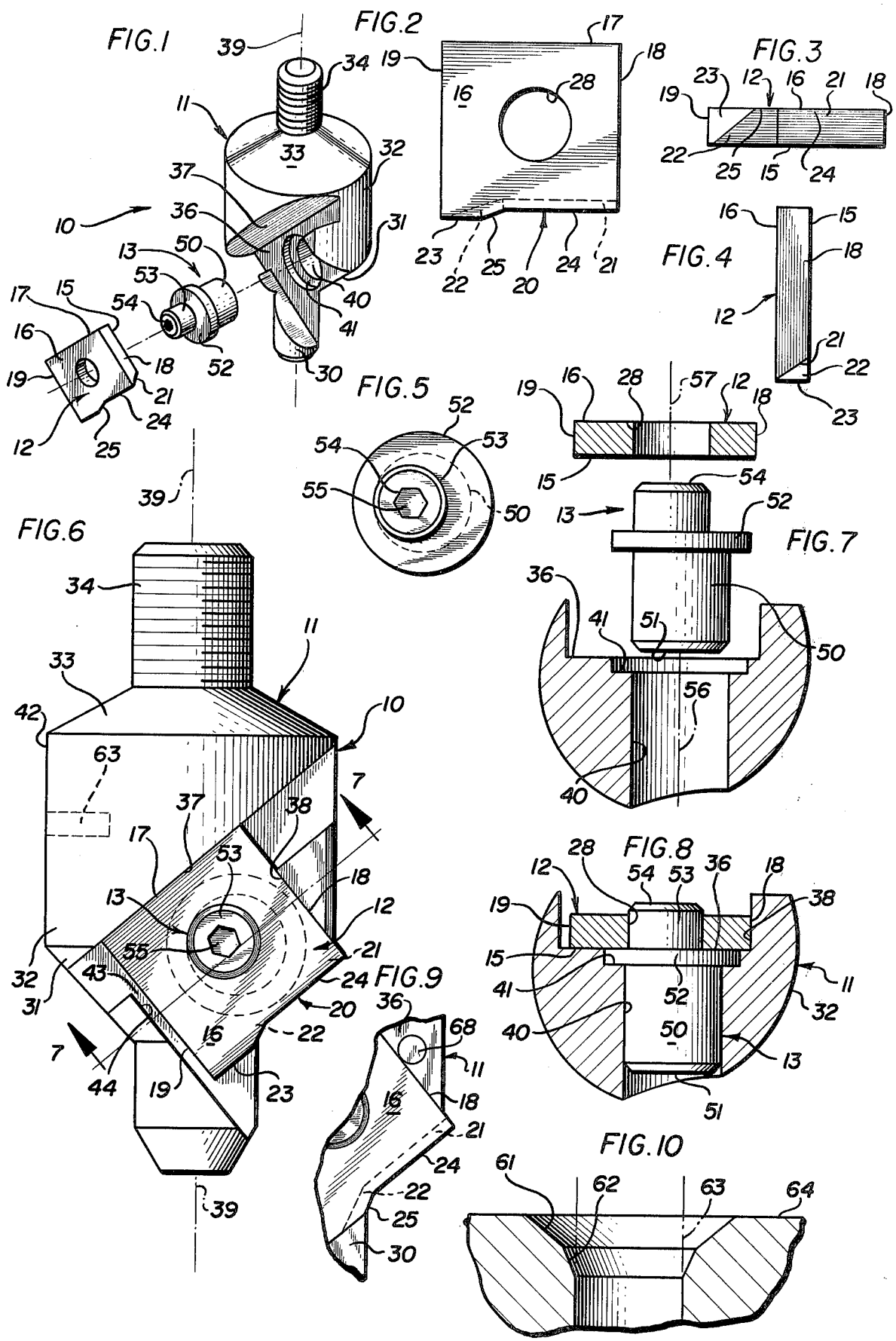

COUNTERSINKING TOOL

RELATED CASE

This is a continuation-in-part of application Ser. No. 860,994 filed Dec. 15, 1977, abandoned.

BACKGROUND OF THE INVENTION

The present invention relates generally to metal cutting tools and more particularly to a tool for countersinking a hole in a workpiece composed of metal, composite materials or the like.

The present invention is especially concerned with a tool for providing the countersunk part of the hole with at least two vertically aligned, outwardly flaring, axially adjoining portions with each portion extending at a different angle relative to the axis of the hole. When the countersunk part of the hole is so formed, it will accommodate the head of a fastener (such as a rivet) having a shank portion from which extends a terminal or head portion flaring outwardly from the shank portion at an angle. In the countersunk part of the hole, the upper outwardly flaring portion engages the head portion of the fastener, and the lower outwardly flaring portion provides a gradual transition between the cylindrical part of the hole and the upper outwardly flaring portion. The provision of a lower outwardly flaring portion eliminates the presence of a sharp corner between the cylindrical part of the hole and the upper outwardly flaring portion. Such a sharp corner could prevent the head of the fastener from being positively seated in the countersunk part.

Conventional countersinking tools have included a rotating shaft on which was brazed a counter-sinking element having a profile conforming to the profile desired in the countersunk part of the hole. However, this type of countersinking element had a relatively large initial expense. Moreover, when it wore down, it had to be removed from its rotating shaft, reground, and then reset on the rotating shaft. The regrinding operation for this countersinking element was relatively expensive. Regrinding was necessary, however, because the large initial expense of the element made it too expensive to be thrown away after it was worn down.

There was another type of element used for the countersinking operation which was initially less expensive than the non-disposable element described above and which could be thrown away after it wore down (e.g., after countersinking 100 holes). However, the initial cost of this disposable element, although substantially less than the cost of the non-disposable element, was still relatively high. More particularly, the disposable element initially cost only about half as much as the non-disposable element, but the initial cost of disposable element was still well over twice the cost of regrinding the non-disposable element. Thus, neither of the prior art countersinking elements was particularly advantageous over the other, from a cost standpoint.

SUMMARY OF THE INVENTION

The present invention relates to a disposable, chiplike countersinking insert which costs substantially less than, but will last as long as, the disposable element utilized by the prior art. Moreover, the replacement cost of this insert is less than even the cost of regrinding the non-disposable element used in the prior art.

The disposable insert is in the form of a flat chip and is mounted in a cutting disposition on a non-disposable holder which in turn is attachable to a conventional machining head for rotating the holder about its axis. The insert and the holder have structural features and relative dimensions which cooperate to facilitate the rapid assembly and disassembly of the insert on the holder and to promote the intended countersinking function of the insert.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 1 is an exploded perspective of a countersinking tool constructed in accordance with an embodiment of the present invention;

FIG. 2 is an enlarged plan view of an embodiment of a disposable insert for the countersinking tool;

FIG. 3 is a front view of the insert of FIG. 2;

FIG. 4 is a side view of the insert;

FIG. 5 is a plan view of a pin used in assembling the insert on the holder;

FIG. 6 is an elevational view of the countersinking tool with the parts all assembled;

FIG. 7 is an exploded sectional view taken along line 7—7 in FIG. 6;

FIG. 8 is a sectional view taken along line 7—7 in FIG. 6;

FIG. 9 is a fragmentary view, similar to FIG. 6, showing another embodiment in accordance with the present invention;

FIG. 10 is a vertical sectional view of a hole in a metal workpiece having a countersunk portion corresponding to that made by a countersinking tool in accordance with the present invention;

DETAILED DESCRIPTION OF THE DRAWINGS

Figure 11:
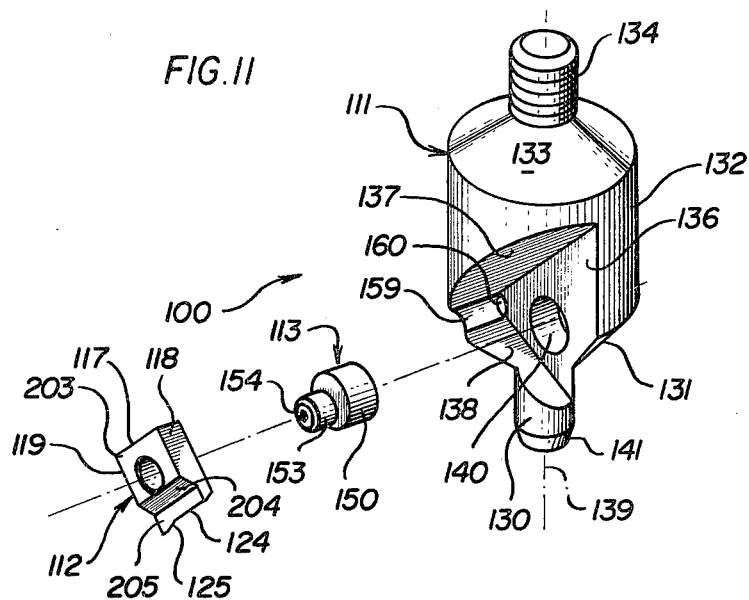
FIG. 11 is an exploded perspective of a countersinking tool constructed in accordance with another embodiment of the present invention.
Figure 12:
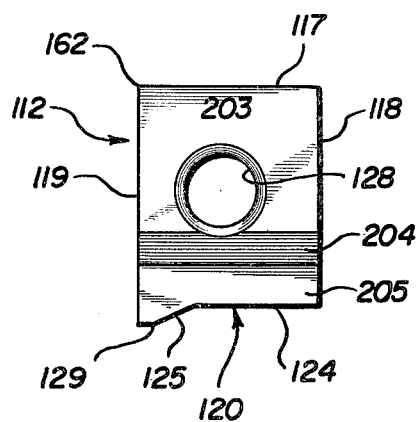
FIG. 12 is an enlarged plan view of an embodiment of a disposable insert for the countersinking tool of FIG. 11.
Figure 13:
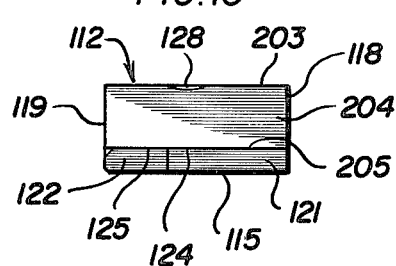
FIG. 13 is a front view of the insert of FIG. 12.
Figure 14:
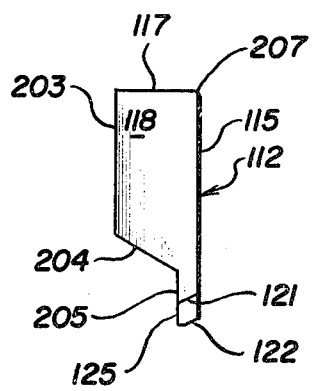
FIG. 14 is a view from one side of the insert of FIG. 12.
Figure 15:
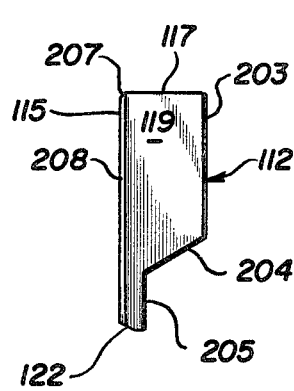
FIG. 15 is a view from another side of the insert of FIG. 12.
Figure 16:
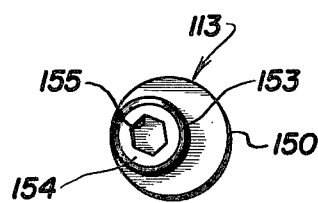
FIG. 16 is a plan view of a pin used in assembling the countersinking tool of FIG. 11.

Referring initially to FIGS. 1 and 6, indicated generally at 10 is a countersinking tool constructed in accordance with an embodiment of the present invention and comprising a holder 11 on which is mounted a disposable insert 12 utilizing a pin 13 to assembly parts 11 and 12 together.

Referring to FIGS. 2-4, insert 12 comprises flat, mutually parallel inner and outer surfaces 15, 16, respectively. Each of surfaces 15, 16 is defined by a plurality of sides comprising a first side 17, a second side 18 adjacent first side 17 and a third side 19. Third side 19 is opposite and parallel to second side 18 and adjacent and at a right angle to first side 17. First and third sides 17, 19 are of equal length.

The insert also comprises a cutting side 20 opposite first side 17 and located between second and third sides 18, 19. Cutting side 20 comprises a plurality of surface portions 21, 22, 23.

In the illustrated embodiment surface portions 21, 22 on cutting side 20 are ground flat and are tapered inwardly from outer surface 16 to inner surface 15. Outer surface 16 is ground flat at least adjacent its junction with tapered surface portions 21, 22 on cutting side 20. Accordingly, a pair of cutting edges 24, 25 are defined by the junction of tapered surface portions 21, 22 with flat outer surface 16. Each of the cutting edge portions 24, 25 is disposed angularly to the other and each is defined by the junction of one of the surface portions 21, 22 with flat outer surface 16.

A hole 28 extends through insert 12, transversely to inner and outer parallel surfaces 15, 16, for assembling insert 12 to holder 11.

Referring to FIGS. 1 and 6, holder 11 has an axis of rotation 39 and comprises a substantially cylindrical, lower guide portion 30 for insertion into the hole to be countersunk. Located axially behind lower guide portion 30 is an inverted, frusto-conical lower portion 31 integral with a substantially cylindrical main body portion 32 in turn integral with a frusto-conical upper portion 33 in turn integral with a threaded, upper portion 34 for attaching holder 11 to driving means for rotating the holder about axis 39.

Insert 12 and holder 11 comprise structural features which cooperate to mount insert 12 in a metal-cutting disposition on holder 11, as shown in FIG. 6.

More specifically, first side 17 on insert 12 is ground flat to provide first surface means for locating the insert on holder 11, and second side 18 on insert 12 is ground flat to provide second surface means for locating the insert on the holder. In addition, inner surface 15 on insert 12 is ground flat to seat the insert on the holder.

Holder 11, in turn, comprises a flat, exposed seating surface 36 ground into holder portions 30, 31, and 32, for seating flat inner surface 15 of insert 12 to mount the insert axially behind guide means 30 on holder 11. Seating surface 36 lies in a plane parallel to axis 39 of holder 11.

Holder 11 also comprises a first flat, exposed locating surface 37 ground into holder portion 32 and perpendicular to flat seating surface 36. Also ground into holder portion 32 is a second flat, exposed locating surface 38, perpendicular to the first flat locating surface 37 and also perpendicular to flat seating surface 36. Second locating surface 38 is separate and discrete from first locating surface 37. The holder's first flat locating surface 37 engages the flat surface of first side 17 on insert 12, and the holder's second flat locating surface 38 engages the flat surface of second side 18 on insert 12.

Holder 11 has a hole 40, extending from seating surface 36 through the holder at an angle to holder axis 39. Formed in seating surface 36 is a recess 41 coaxial with and surrounding hole 40 (FIGS. 1 and 7-8).

As indicated above, pin 13 is used to assemble insert 12 on holder 11. Pin 13 is rotatable to lock insert 12 on holder 11 in the cutting disposition illustrated in FIG. 6. The features of pin 13 are described below, with reference to FIGS. 1 and 5-8.

Pin 13 has an axis 56 (FIG. 7) and comprises a cylindrical body portion 50 having an end 51 and a flange 52 remote from end 51. Extending longitudinally from flange 52 is a stud 53 having a terminal end 54. Extending into stud 53 from terminal end 54 is a recess 55 for receiving a tool to rotate pin 13 about its axis 56. The axis 57 of stud 53 and recess 55 is offset relative to axis 56 of pin 13. Accordingly, rotation of pin 13 about its axis 56 causes stud 53 to move eccentrically rather than rotate about stud axis 57.

The assembly of insert 12 on holder 11 and the locking of insert 12 in the cutting disposition illustrated in FIG. 6 will now be described.

Referring to FIG. 8, initially pin 13 is inserted into hole 40 in holder 11 with the pin's cylindrical body portion 50 located within hole 40 and the pin's flange 52 seated on recess 41 surrounding hole 40. In this disposition, pin 13 is mounted for rotation about its axis 56, and stud 53 extends outwardly relative to seating surface 36 on holder 11. Insert 12 is then seated on holder 11 with hole 28 in insert 12 receiving stud 53.

A tool is then inserted into recess 55 in offset stud 53, and the tool is rotated in a clockwise sense (as viewed in FIGS. 5 and 6) in turn rotating pin 13 about its axis 56 (FIG. 7) and causing stud 53 to move eccentrically relative to its axis 57 and to the axis of insert hole 28. The outside surface of stud 53 engages the inside surface of insert hole 28. As a result of this engagement, when pin 13 is rotated in a clockwise sense, the insert is urged into the locked position, illustrated in FIGS. 6 and 8, wherein the flat surface on the first side 17 of the insert engages the first locating surface 37 on holder 11 and the flat surface on the second side 18 of insert 12 engages the second locating surface 38 on holder 11.

The insert may be readily disengaged from its locked position on holder 11 merely by rotating pin 13 in a counterclockwise sense, from the position illustrated in FIG. 6. When this occurs, as a result of the engagement between the outer surface of stud 53 and the inner surface of hole 28 in insert 12, the insert is urged from its locked position to a loose, unlocked position in which the insert's first side 17 is spaced from the holder's first locating surface 37 and in which the insert's second side 18 is spaced from the holder's second locating surface 38. Thus, the engagement between the outside surface of offset stud 53 and the inside surface of insert hole 28 effectuates the urging of the insert between its two positions in response to rotation of pin 13. As shown in FIG. 6, there is a clearance 43 between third side 19 on insert 12 and the adjacent portion 44 of holder 11, when insert 12 is in its locked position on holder 11. Clearance 43 accommodates movement of insert 12 between its locked and unlocked positions in response to rotation of pin 13 to lock and unlock insert 12 on holder 11.

Flange 52 on pin 13 prevents the pin from falling through hole 40. Locating tool-recess 55 in stud 53 of pin 13 rather than at end 51 of pin 13 prevents pin 13 from being pushed out of hole 40 in holder 11 during rotation of pin 13, a disadvantage which would arise if recess 55 had been located at end 51 of pin 13. In other words, if the hole for the tool were located at end 51 of pin 13 rather than at end 54 of stud 53, there would be a tendency for the tool to push pin 13 out of hole 40 in holder 11 during the locking operation, and pin 13 would have to be held manually as stud end 54 to prevent this from occurring.

Holder 11, with insert 12 attached thereto in the cutting disposition indicated in FIG. 6, is rotated about its axis 39, during a countersinking operation. When holder 11 is thus rotated, each of the cutting edge portions 24, 25 on cutting side 20 of insert 12, defines a respective frusto-conical surface of revolution.

Pin 13 is sufficiently short so that, during rotation of holder 11 and insert 12, the totality of pin 13, including end 51, is located entirely within the frusto-conical surfaces of revolution defined by cutting edges 24, 25 on insert 12.

Referring to FIG. 10, there is illustrated a metal workpiece having a hole 60 comprising a pair of adjoining, outwardly flaring countersunk portions 61, 62 each flaring outwardly at a different angle. Prior to the countersinking opertion, hole 60 extends, with a uniform diameter, all the way to the outer surface 64 of the metal workpiece, as indicated by the dash-dot lines at 63. During the countersinking operation, guide means 30 on holder 11 is inserted into hole 60, the holder is rotated about its axis 39 and the cutting edge portions 25, 24 on insert 12 are advanced into hole 60, in that sequence. During the countersinking operation, cutting edge portion 25 cuts out countersunk portion 62 and cutting edge portion 24 cuts out countersunk portion 61.

As shown in FIG. 6, the threaded upper terminal portion 34 of holder 11 is located axially behind insert 12. Threaded portion 34 provides for the attachment of the holder to driving means for rotating the holder (not shown). Attachment is effected by turning the holder about its axis 39 in a first sense to screw threaded portion 34 into a threaded hole (not shown) in the driving means. Detachment of the holder from the driving means is effected by turning the holder in a sense opposite that in which the holder was turned for attachment purposes.

The driving means often includes a grid-like safety cage (not shown) which surrounds the attached holder, and this cage makes it difficult to grasp the holder with one's fingers from below with sufficient grip to turn the attached holder so as to detach it from the driving means.

To minimize this problem, the cylindrical main body portion 32 of holder 11 is provided with a flat side surface 42 on the periphery of holder 11 (FIG. 6). Surface 42 is located axially behind both lower guide portion 30 and inverted frusto-conical lower portion 31 of holder 11, and surface 42 is circumferentially spaced from insert 12 when the latter is attached on holder 11.

Extending into holder 11 from surface 42 is a hole 63 (FIG. 6) for receiving a tool to assist in the turning motion required to unloosen holder 11 from its threaded engagement with the driving means for the holder. Such a tool may be a short rod or the like which may be inserted through a space in the grid of the cage surrounding holder 11, and the tool may be used as a lever to turn holder 11 about its axis 39 to loosen it from its threaded engagement with the driving means.

After holder 11 has been thus loosened, the holder can be readily unscrewed for detachment from the driving means with one's fingers reaching up and grasping the lower portion 30 of the holder 11.

Insert 12 is fabricated from a flat, square blank or chip composed of material conventionally utilized for metal cutting elements, such as tungsten carbide or certain alloys. During fabrication, the inner and outer surfaces of the blank, corresponding to inner and outer surfaces 15 and 16 of insert 12, are ground flat. Then three sides of the blank are ground flat and the cutting surface portions 21, 22 are ground into the remaining side. Because all of the first three sides are ground flat, no matter which side remains to be ground as the cutting side, the side opposite that side and each of the sides adjacent thereto will have been ground flat so that each could function as a locating surface. Accordingly, on insert 12, third side 19 although not operating as a locating surface as do sides 17 and 18 of insert 12, could function as such if it had been necessary to do so. In other words, if, by chance, side 17 had remained to be the cutting side rather than side 20, with sides 18, 19 and 20 previously having been ground flat, sides 19 and 20 would automatically function as locating surfaces.

As indicated above, second locating surface 28 on insert 12 is engaged against second locating surface 38 on holder 11. In lieu of a second locating surface 38, the holder may be provided with a pin 68 (FIG. 9) extending outwardly from seating surface 36 on holder 11. The advantage of pin 68 is that it eliminates the need to precision grind a mating surface 38 on holder 11 for engaging the flat ground surface 18 on insert 12. Pin 68 engages surface 18 on pin 13 along a line, rather than along a plane as does surface 38 in the embodiment illustrated in FIG. 6. When there is plane-to-plane engagement, as in the embodiment of FIG. 6, both planes (i.e., surfaces 18 and 38) must be precision ground. The replacement of flat ground surface 38 on holder 11 by pin 68, reduces the cost of fabrication of holder 11.

Figure 17:
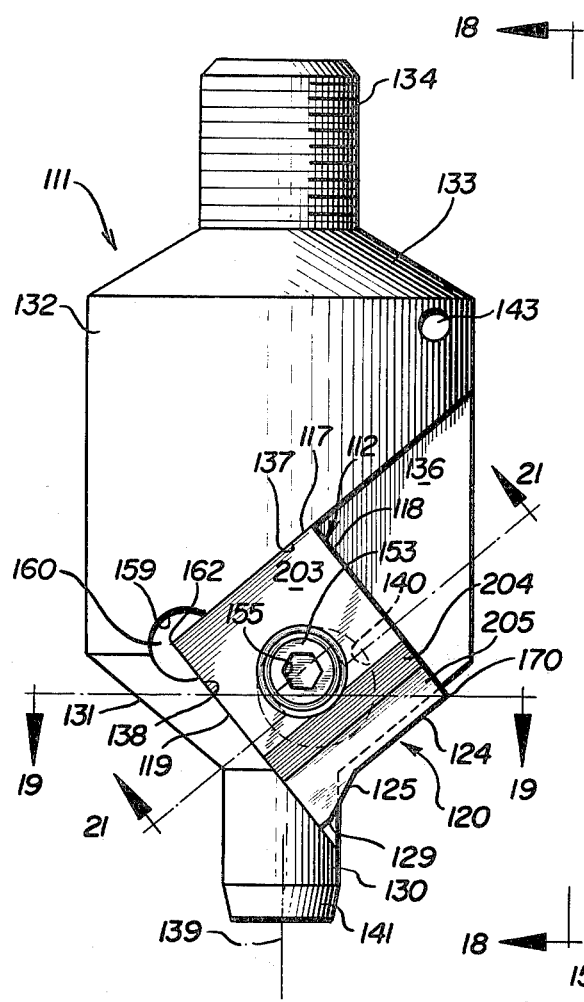
FIG. 17 is an elevational view of the countersinking tool of FIG. 11 with the parts all assembled.
Figure 18:
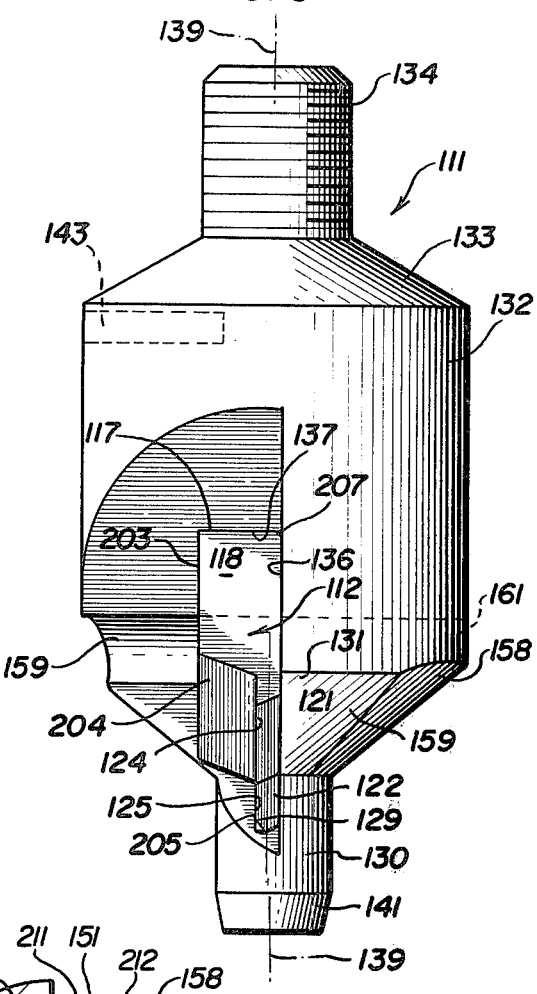
FIG. 18 is a side view taken along line 18—18 in FIG. 17.

Referring now to FIGS. 11 and 17–18, indicated generally at 100 is a countersinking tool constructed in accordance with another embodiment of the present invention and comprising a holder 111 on which is mounted a disposable insert 112 utilizing a pin 113 to assemble parts 111 and 112 together. Many of the structural and functional features of the embodiment of FIGS. 11–21 correspond to similar features in the embodiment of FIGS. 1–10. These similarities are readily apparent from the drawings, and, in such cases, may not be re-described below in discussing the details of the embodiment of FIGS. 11–21.

Referring to FIGS. 11–15, cutting insert 112 comprises an inside surface having a plurality of inside surface portions 115, 121 and 122. First inside surface portion 115 comprises means for seating insert 112 on holder 111.

Insert 112 further includes a plurality of peripheral portions 117, 118 and 119. First peripheral portion 117 comprises first surface means for locating insert 112 on holder 111. A second peripheral portion 118 adjoins and extends at an angle to first peripheral portion 117. A third peripheral portion 119 is located opposite second peripheral portion 118. Third peripheral portion 119 comprises second surface means for locating insert 112 on holder 111. A peripheral cutting side comprising cutting edge portions 124, 125 is located opposite first peripheral portion 117 and between second and third peripheral portions 118, 119. Each of peripheral portions 117, 119 comprises a respective chamfered part 207, 208 where the peripheral portion adjoins first inside surface portion 115.

Insert 112 also comprises a plurality of outside surface portions 203, 204 and 205. A hole 128 extends from first outside surface portion 203 to first inside surface portion 115 and comprises means for receiving a retaining pin for assembling insert 112 to holder 111.

A second outside surface portion 204 adjoins first outside surface portion 203 and extends angularly therefrom away from first peripheral portion 117 and toward the inside surface of the insert. Third outside surface portion 205 adjoins second outside surface 204 and extends angularly therefrom, away from first peripheral portion 117. Third outside surface portion 205 terminates at an outer extremity defined by cutting edge portions 124, 125. Second outside surface portion 204 extends at an angle (e.g., 30°) away from third outside surface portion 205 and from cutting edge portions 124, 125 at the extremity of third outside surface portion 205. This angle guides chips, removed by the cutting edge portions, away from the workpiece and provides an escape route for the chips and prevents them from curling back toward the workpiece.

Second inside surface portion 121 extends from cutting edge portion 124 to first inside surface portion 115, and third inside surface portion 122 extends from cutting edge portion 125 to first inside surface portion 115. Cutting edge portion 125 adjoins first cutting edge portion 124 and is disposed angularly thereto.

Referring to FIGS. 11 and 17–18, holder 111 has an axis of rotation 139 and comprises a substantially cylindrical, lower guide portion 130 for insertion into the hole to be countersunk. Located axially behind lower guide portion 130 is an inverted, frusto-conical intermediate portion 131 integral with a substantially cylindrical main body portion 132 in turn integral with a frusto-conical upper portion 133 in turn integral with a threaded, top portion 134 for attaching holder 111 to driving means for rotating the holder about axis 139.

Holder 111 comprises a flat, exposed seating surface 136 ground into holder portions 130, 131, and 132, for seating flat inner surface portion 115 of insert 112 to mount the insert axially behind guide means 130 on holder 111. Seating surface 136 lies in a plane parallel to axis 139 of holder 111.

Holder 111 also comprises a first flat, exposed locating surface 137 ground into holder portion 132 and perpendicular to flat seating surface 136. Ground into holder portion 131 is a second flat, exposed locating surface 138, perpendicular to both first locating surface 137 and seating surface 136. Second locating surface 138 is separate and discrete from first locating surface 137. The holder's first flat locating surface 137 engages the flat surface of first peripheral portion 117 on insert 112, and the holder's second flat locating surface 138 engages the flat surface of third peripheral portion 119 on insert 112.

Holder 111 has a hole or opening 140, extending from seating surface 136 through the holder at an angle to holder axis 139. Hole 140 comprises an enlarged portion 210 communicating with seating surface 136, a tapered seat portion 211 and a reduced portion 212 communicating with the peripheral surface of holder 111.

Referring now to retaining pin 113 (FIGS. 16–17 and 19–21), the pin comprises a cylindrical first portion 150 receivable within hole 140 in holder 111, an end 151 and a tapered portion 152 adjacent end 151. When assembled (FIG. 21), first pin portion 150 is coaxial with both opening 128 in insert 112 and hole 140 in holder 111. First pin portion 150 has a larger diameter than opening 128 in the insert.

Tapered pin portion 152 rests on tapered seat portion 211 in hole 140 of holder 111, to mount the pin for rotation about the axis 156 of the pin's first portion 150.

A stud portion 153 extends integrally from first pin portion 150 and is receivable within opening 128 in insert 112. Stud portion 153 has an axis 153 parallel to and offset from axis 156 of first pin portion 150. The stud portion has a smaller cross-section than first pin portion 150 and comprises means for engaging the sides of insert opening 128 to urge insert 112 in a direction transverse to the axis thereof in response to rotation of pin 113 about the axis 156 of first pin portion 150.

Stud portion 153 has a terminal end 154, and extending into stud portion 153 from terminal end 154 is a recess 155 for receiving a tool to manually rotate the pin about the axis 156 of first pin portion 150.

Figure 20:
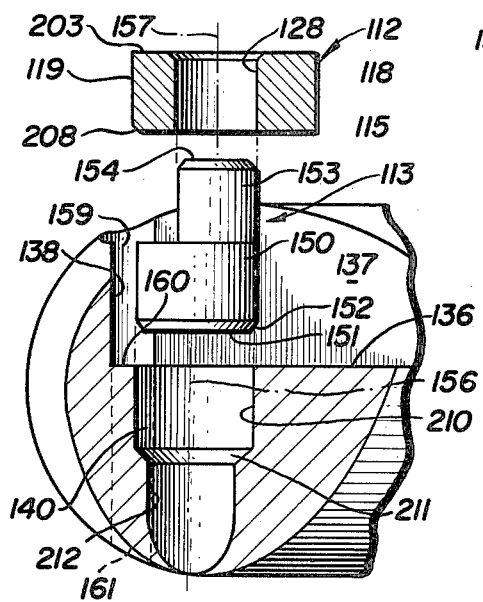
FIG. 20 is an exploded sectional view taken along line 20—20 in FIG. 17.
Figure 19:
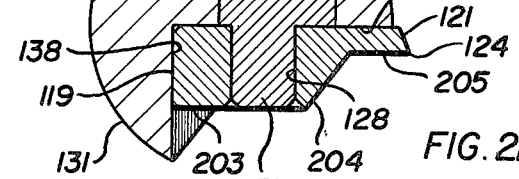
FIG. 19 is a sectional view taken along line 19—19 in FIG. 17.
Figure 21:
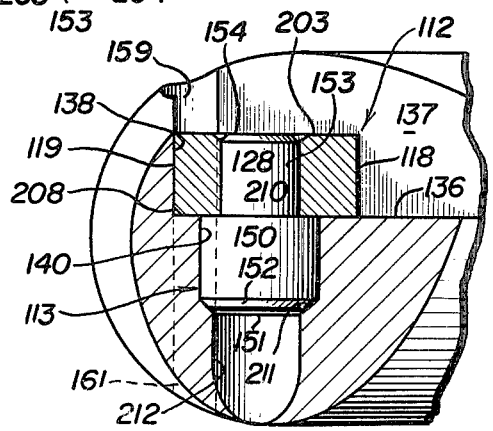
FIG. 21 is a sectional view taken along line 21—21 in FIG. 17.

Referring to FIGS. 20–21, when the tool is assembled, pin 113 is inserted into hole 140 in holder 111 with the pin's first portion 150 located within enlarged hole portion 210 and the pin's tapered portion 152 seated on the hole's tapered seat portion 211. In this disposition, pin 113 is mounted for rotation about its axis 156, and stud portion 153 extends outwardly relative to seating surface 136 on holder 111. Insert 112 is then seated on holder 111 with hole 128 in insert 112 receiving stud 153.

A tool is then inserted into recess 155 in offset stud portion 153 to rotate pin 113 about axis 156. When pin 113 is rotated in a first sense, the insert is urged toward and locked into the cutting disposition, illustrated in FIGS. 17 and 21. The insert may be readily disengaged from the disposition illustrated in FIG. 17 merely by rotating pin 113 in a second sense opposite the first sense.

Holder 111, with insert 112 attached thereto in the cutting disposition indicated in FIG. 17, is rotated about its axis 139 during a countersinking operation. When holder 111 is thus rotated, each of the cutting edge portions 124, 125 on cutting side 120 of insert 112, defines a respective frusto-conical surface of revolution.

The exterior of guide portion 130 on holder 111 also defines a surface of revolution when the holder is rotated about its axis. When insert 112 is mounted on holder 111, the most axially forward part of any cutting edge portion on the cutting side of the insert is indicated by numeral 129 in FIGS. 12 and 17, and this most axially forward part 129 lies within the surface of revolution defined by the holder's lower guide portion 130 during rotation of the holder about its axis. If cutting edge part 129 lay outside the surface of revolution defined by lower guide portion 130, part 129 would cut a step in the hole in the workpiece, a defect which is undesirable and should be avoided.

Guide portion 130 has a tapered terminal end portion 131 for initial insertion, before the rest of guide portion 130, into a hole to be countersunk in a workpiece. The purpose of tapered terminal end portion 141 is to provide a clearance between the guide portion and the side walls of the hole to be countersunk, when the guide portion is initially introduced into the workpiece hole. The walls of the hole in the workpiece are composed of a material which may have a tendency to spring back slightly after the hole has been bored. Absent tapered terminal end portion 211 on guide portion 130, there would be a tendency for the terminal end portion to rub on the sides of the hole undergoing countersinking (at 63 in FIG. 10), and this could cause a heat build-up. Providing a taper on the terminal end of the guide portion reduces the rubbing and heat build-up, compared to a situation where the terminal end portion was untapered.

On holder 111, main body portion 132 and intermediate portion 131 each define a respective surface of revolution when the holder 111 is rotated about its axis. The surfaces of revolution defined by the cutting edge portions 124, 125 of insert 112, lie outside the surface of revolution defined by intermediate portion 131. Further with respect to the surfaces of revolution defined by the cutting edge portions, the point of maximum radius thereof (at 170 in FIG. 17) is less than the maximum radius of the surface of revolution defined by main body portion 132. It is necessary for the surfaces of revolution defined by the cutting edge portions of the insert to lie outside of the surface of revolution defined by the intermediate portion of the holder in order for the cutting edge portions to perform their material-removal functions. On the other hand, if part of the surfaces of revolution defined by the cutting edge portions of the insert had a maximum radius greater than the maximum radius of the surface of revolution defined by main body portion 132, the cutting edge portions would interfere with the protective cage (not shown) normally surrounding holder 111 and its main body portion.

Referring again to intermediate portion 131 of holder 111, at least part of seating surface 136 is located on intermediate portion 131.

Intermediate portion 131 has a peripheral part 158 (FIGS. 18 and 19) which is indented relative to the surface of revolution defined by intermediate portion 131. Indented peripheral part 158 is angularly spaced from seating surface 136 and trails the latter when holder 111 is rotated in a countersinking operation.

The indented peripheral part accommodates axially advancing movement of intermediate portion 131 into the countersunk hole during the countersinking operation. More specifically, as holder 111 rotates, it also advances axially into the hole undergoing countersinking. In an automatic operation, it is possible to control the rate of axial advance in relation to the rate of metal removal resulting from rotation of the holder and cutting insert, so that the intermediate portion's peripheral surface does not rub against the sides of the hole undergoing countersinking. However, with manual operation, there may be a tendency to advance the holder axially in such a manner as to cause rubbing between the periphery of the intermediate portion 131 and the sides of the hole. By providing indented part 158 on intermediate portion 131, the likelihood of such rubbing is minimized.

Indented peripheral part 158 is angularly spaced from seating surface 136 by about at least 45 degrees. The unindented peripheral part 159 of the intermediate portion, extending from (a) immediately adjacent cutting edges 124, 125 to (b) a location 45 degrees removed from seating surface 136 (FIGS. 18-19), is already sufficiently indented relative to cutting edge portions 124, 125 that the likelihood of rubbing by peripheral part 159 is not a problem. Typically, cutting edge portion 124 extends about 0.020 inches beyond peripheral part 159 and indented part 158 is indented about 0.020 inches relative to unindented part 159.

As noted above, holder 111 has a hole 140 for receiving retaining pin 113. This hole is located at least partially in intermediate portion 131 of the holder, and the peripheral surface closest to the major part of hole 140 (enlarged hole portion 210) is unindented part 159. This has the effect of making the wall portion surrounding that part of hole 140 closest to surface part 159 thicker and stronger than would be the case if surface part 159 were indented. That part of hole 140 closest to indented peripheral part 158 has a reduced diameter (hole portion 212) and is a minor part of hole 140. This has the effect of strengthening the wall portion surrounding that part of the hole adjacent indented surface part 158 compared to the strength and thickness that the wall would have if that part of the hole did not have a reduced diameter.

Referring to FIG. 18, the cutting edge portions 124, 125 on the insert lie in a plane parallel to the holder's seating surface 136 and are located rotatably in advance of another parallel plane passing through axis 139 of holder 111. This provides what is known as a negative cut, in contrast to a positive cut which would occur if the cutting edge portions of the insert were located on a plane rotatably behind a parallel plane passing through axis 139 of holder 111. With a negative cut, the cutting edge portions dig or bite into the material undergoing countersinking in a smooth, relatively gradual bite, whereas with a positive cut, the digging or biting into the material is much more abrupt, and the latter is undesirable.

As shown in FIG. 17, first and second locating surfaces 137, 138 on holder 111 converge toward a recess 159 axially aligned with a hole having one open end 160 at seating surface 136 and another open end 161 opposite open end 160 at a peripheral surface portion on holder 111 remote from seating surface 136. Recess 159 and hole 160-161 comprise means for removing from the vicinity of seating surface 136 chips or other material removed from the workpiece during the countersinking operation, or other debris. More specifically, during the countersinking operation, an air blast is directed toward recess 159 to urge dust, chips and the like toward the recess and then out through hole 160-161. In addition, when insert 112 is replaced, it is desirable to clean seating surface 136 with an air blast, and hole 160-161 facilitates the removal of chips etc. from seating surface 136.

Recess 159 also accommodates the corner 162 where peripheral portions 117, 119 of insert 112 converge, to facilitate a close mating between surfaces 117 and 119 on insert 112 with surfaces 137 and 138 on holder 111, respectively. In the absence of a recess such as 159 at the corner where locating surfaces 137, 138 would otherwise converge, there would be interference with the close mating between the seating surfaces 117, 119 on the insert and the locating surfaces 137, 138 on the holder.

Located in main body portion 132, adjacent upper frusto-conical portion 133 is a recess or hole 143 which serves the same function as hole 43 in holder 11 illustrated in FIGS. 1 and 6, and described above in connection with the description of the embodiment of FIGS. 1-10.

Each of the two locating surfaces 117, 119 on insert 112 are chamfered at their respective bottoms at 207, 208 to avoid corner contact with the corners defined by the intersection of seating surface 136 with holder locating surfaces 137 and 138. By removing the corners on the insert, it is not necessary to effect an alignment between the corners on the insert and the corners on the holder and accurate seating is made easier. The same result could be accomplished by eliminating chamfers 207, 208 and, instead, undercutting the corners on the holder where seating surface 136 joins locating surfaces 137, 138.

The foregoing detailed description has been given for clearness of understanding only, and no unnecessary limitations should be understood therefrom, as modifications will be obvious to those skilled in the art.

What is claimed is:

1. A cutting insert for use with a holder as a countersinking tool, said cutting insert comprising:
   an inside surface having a plurality of inside surface portions;
   a first of said inside surface portions comprising means for seating said insert on said holder;
   a first peripheral portion comprising first surface means for locating said insert on said holder;
   a second peripheral portion adjoining and extending at an angle to said first peripheral portion, said second peripheral portion comprising second surface means for locating said insert on the holder;
   a third peripheral portion opposite said second peripheral portion;
   a first outside surface portion;
   an opening in said insert extending from said first outside surface portion to said first inside surface portion and comprising means for receiving a retaining pin;
   a peripheral cutting side opposite said first peripheral portion and located between said second and third peripheral portions;
   at least one cutting edge portion on said peripheral cutting edge;
   a second outside surface portion adjoining said first outside surface portion and extending angularly therefrom away from said first peripheral portion and toward one of said inside surface portions;
   a third outside surface portion adjoining said second outside surface portion and extending angularly therefrom, away from said first peripheral portion, said third outside surface portion terminating at an outer extremity located at said cutting edge portion;
   a second inside surface portion extending from said cutting edge portion to said first inside surface portion;
   another cutting edge portion at said outer extremity of the third outside surface portion, said other cutting edge portion adjoining said first-recited cutting edge portion and extending angularly thereto;
   and a third inside surface portion extending from said other cutting edge portion to said first inside surface portion.

2. In combination with the cutting insert of claim 1:
   a retaining pin comprising a first portion coaxial with said opening in the insert, said first pin portion having a large diameter than the opening in the insert;
   a stud portion extending integrally from said first pin portion and receivable within said opening in the insert;
   said stud portion having an axis parallel to and offset from the axis of said first pin portion;
   said stud portion having a smaller cross-section than said first pin portion;
   said stud portion having means for engagement with a tool for rotating said pin about the axis of said first pin portion;
   said stud portion having means for engaging the sides of said opening to urge said insert in a direction transverse to the axis of said opening in response to rotation of said pin about the axis of said first pin portion.

3. A cutting insert as recited in claim 1 wherein:
   each of said first and second peripheral portions comprises a respective chamfered part where said first and second peripheral portions adjoin said first inside surface portion.

4. A cutting insert as recited in claim 1 wherein:
   said third peripheral portion is parallel to said second peripheral portion and at a right angle to the first peripheral portion;
   said first and third peripheral portions are equal in length;
   and said third peripheral portion comprises third surface means for enabling said third peripheral portion to function as a locating surface.

5. In combination, a rotatable holder and a cutting insert for use with said holder as a countersinking tool, said cutting insert comprising:
   an inside surface portion comprising means for seating said insert on said holder;
   a first peripheral portion comprising first surface means for locating said insert on said holder;
   a second peripheral portion adjoining and extending at an angle to said first peripheral portion, said second peripheral portion comprising second surface means for locating said insert on the holder;
   a peripheral cutting side opposite said first peripheral portion;
   and at least one cutting edge portion on said peripheral cutting side;
   said holder having an axis of rotation and comprising:
   a seating surface lying in a plane parallel to the axis of said holder and comprising means cooperating with said first inside surface portion on the insert to seat said insert;
   a first locating means on the holder for engaging said first surface means on the first peripheral portion of the insert;
   and second locating means on the holder, separate and discrete from the holder's first locating means, for engaging said second surface means on the second peripheral portion of said insert;
   said locating means on said holder and said peripheral surface means on said insert cooperating to mount said insert in a disposition in which said cutting edge portion on the insert defines an inverted frusto-conical surface of revolution when the holder is rotated about its axis;
   said first and second locating means on the holder each comprise a respective surface converging toward a corner;
   and a hole in said holder at said corner;
   said hole having one open end at said seating surface and another open end, opposite said one open end at a peripheral surface portion on the holder remote from said seating surface;
   said hole comprising means for removing material from the vicinity of said seating surface.

6. In combination, a rotatable holder and a cutting insert for use with said rotatable holder as a countersinking tool:
   said cutting insert comprising a peripheral cutting side having at least one cutting edge portion;
   said holder having an axis of rotation and comprising a seating surface lying in a plane parallel to the axis of said holder and comprising means for seating said insert;

locating means on said holder and on said insert cooperating to mount said insert in a disposition in which said cutting edge portion on the insert defines an inverted frusto-conical surface of revolution when the holder is rotated about its axis;

said holder comprising a main body portion and an intermediate portion adjacent said main body portion;

said main body portion and said intermediate portion each defining a respective surface of revolution when the holder is rotated about its axis;

the surface of revolution defined by said cutting edge portion of the insert lying outside the surface of revolution defined by said intermediate portion;

at least a part of said seating surface on the holder being located on said intermediate portion;

said intermediate portion having a peripheral part which is indented, relative to said surface of revolution defined by the intermediate portion, and having an unindented part;

said indented peripheral part being angularly spaced about 45° from said seating surface by said unindented part and trailing the seating surface when said holder is rotated in a countersinking operation;

said indented peripheral part extending on the intermediate portion to at least a portion of the seating surface and comprising means for accommodating axially advancing movement of said intermediate portion into a countersunk hole during a countersinking operation;

said unindented part being indented relative to the surface of revolution defined by said cutting edge portion on the insert.

7. In the combination of claim 6 wherein:
said holder comprises guide means for insertion into the hole to be countersunk;
the exterior of said guide means defines a surface of revolution when said holder is rotated about its axis;
and the most axially forward part of any cutting edge on said cutting side on the insert lies within said surface of revolution defined by said guide means.

8. In the combination of claim 7 wherein:
said guide means has a tapered terminal end portion for initial insertion, before the rest of said guide means, into said hole to be countersunk.

9. In the combination of claim 6 wherein:
the surface of revolution defined by said cutting edge portion of the insert lies outside the surface of revolution defined by said intermediate portion and has a maximum radius less than the maximum radius of the surface of revolution defined by said main body portion.

10. In the combination of claim 9 wherein:
the exterior of said guide means defines a surface of revolution when said holder is rotated about its axis;
and the most axially forward part of any cutting edge on said cutting side on the insert lies within said surface of revolution defined by said guide means.

11. In the combination of claim 6:
a hole extending from said seating surface of the holder through said holder at an angle to the axis of the holder;
said hole being located at least partially in said intermediate portion of the holder; and the closest peripheral surface to the major part of said hole being outside said indented peripheral surface part.

12. In the combination of claim 11 wherein:
said indented peripheral surface part is the closest peripheral surface to a minor part of said hole;
and said minor part of the hole has a reduced cross-sectional area compared to said major part of the hole.

13. In the combination of claim 6 wherein:
said cutting edge portion on the insert lies in a plane parallel to said seating surface and located rotatably in advance of a parallel plane passing through the axis of said holder.

14. In a combination as recited in claim 6 wherein said insert is mounted on said holder axially behind at least part of said guide means on the holder, said holder further comprising:
means, located axially behind said insert, for attaching said holder to driving means for rotating said holder, in response to a turning motion of the holder about its axis, in one sense, and for detaching said holder in response to a turning motion of the holder in another sense, opposite said one sense;
and a hole in said holder extending inwardly from the periphery of said holder, said hole being located axially behind said guide means and peripherally spaced from said insert;
said hole comprising means for receiving a tool to assist with said turing motion.

15. In the combination of claim 6 wherein:
said first locating means on the holder comprises a flat surface;
and said second locating means on the holder comprises a pin.

16. In the combination of claim 6 and comprising:
a hole extending from said seating surface of the holder through said holder, at an angle to the axis of the holder, and terminating at said indented peripheral part of the holder's intermediate portion;
said hole having one part closer to said seating surface and another part closer to said indented peripheral part;
said other part of the hole having a reduced diameter compared to said one part of the hole;
the peripheral part of said intermediate portion which is closest to said one part of the hole being said unindented part.

17. In combination, a rotatable holder and a cutting insert for use with said holder as a countersinking tool, said cutting insert comprising:
an inside surface portion comprising means for seating said insert on said holder;
an outside surface portion;
an opening in said insert extending from said outside surface portion to said inside surface portion and comprising means for receiving a retaining pin;
and a peripheral cutting side having at least one cutting edge portion;
said holder having an axis of rotation and comprising:
a seating surface lying in a plane parallel to the axis of said holder and comprising means cooperating with said inside surface portion of the insert to seat said insert;
locating means on said holder and on said insert cooperating to mount said insert in a disposition in which said cutting edge portion on the insert defines an inverted frusto-conical surface of revolution when the holder is rotated about its axis;

a hole extending from said seating surface of the holder through said holder at an angle to the axis of the holder;

a retaining pin comprising a first portion received wherein said hole in the holder, said first pin portion being coaxial with said opening in the insert and said hole in the holder;

said first pin portion having a larger diameter than the opening in the insert;

means on said holder and on said pin mounting said pin for rotation about the axis of said first pin portion;

a stud portion extending integrally from said first pin portion and receivable within said opening in the insert;

said stud portion having an axis parallel to and offset from the axis of said first pin portion;

said stud portion having a smaller cross-section than said first pin portion;

said stud portion having means for engaging the sides of said opening to urge said insert in a direction transverse to the axis of its opening in response to rotation of said pin about the axis of said first pin portion.

18. The combination of claim 17 wherein:
said stud portion has means for engagement with a tool for rotating said pin about the axis of said first pin portion.

19. The combination of claim 17 wherein said pin-mounting means comprises:
seat means within said hole in the holder;
and means, on said first pin portion, for resting on said seat means.

20. The combination of claim 19 wherein:
both (a) said seat means within the hole and (b) said means on the first pin portion for resting on said seat means are tapered.

21. In the combination of claim 17 wherein:
said pin means extends from said flat seating surface through said hole in the holder and terminates at an end;
said cutting edge portion on the insert defines an inverted frusto-conical surface of revolution when the holder is rotated about its axis;
and the totality of said pin means, including said end, is located within said frusto-conical surface of revolution.

* * * * *

UNITED STATES PATENT AND TRADEMARK OFFICE
CERTIFICATE OF CORRECTION

PATENT NO. : 4,197,042
DATED : April 8, 1980
INVENTOR(S) : Frank J. Krhounek, et al It is certified that error appears in the above-identified patent and that said Letters Patent are hereby corrected as shown below:

Col. 11, line 31, "cutting edge" should be

-- "cutting side" --

Col. 15, line 7, "wherein" should be

-- "within" --

Signed and Sealed this

Fifteenth Day of July 1980

[SEAL]

Attest:

SIDNEY A. DIAMOND

Attesting Officer     Commissioner of Patents and Trademarks